April 29, 1947.  C. E. KILBOURNE  2,419,839

DAMPER WINDING FOR SYNCHRONOUS MACHINES

Filed Oct. 23, 1943

Inventor:
Charles E. Kilbourne,
by Harry E. Dunham
His Attorney.

Patented Apr. 29, 1947

2,419,839

UNITED STATES PATENT OFFICE 2,419,839

DAMPER WINDING FOR SYNCHRONOUS MACHINES

Charles E. Kilbourne, Schenectady, N. Y., assignor to General Electric Company, a corporation of New York Application October 23, 1943, Serial No. 507,390

6 Claims. (Cl. 171—252)

My invention relates to dynamoelectric machines and more particularly to a damping and starting winding for synchronous alternating current machines.

An object of my invention is to provide an improved damping and starting winding for a synchronous dynamoelectric machine.

Another object of my invention is to provide an improved dynamoelectric machine having a damping winding formed of composite conductors.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
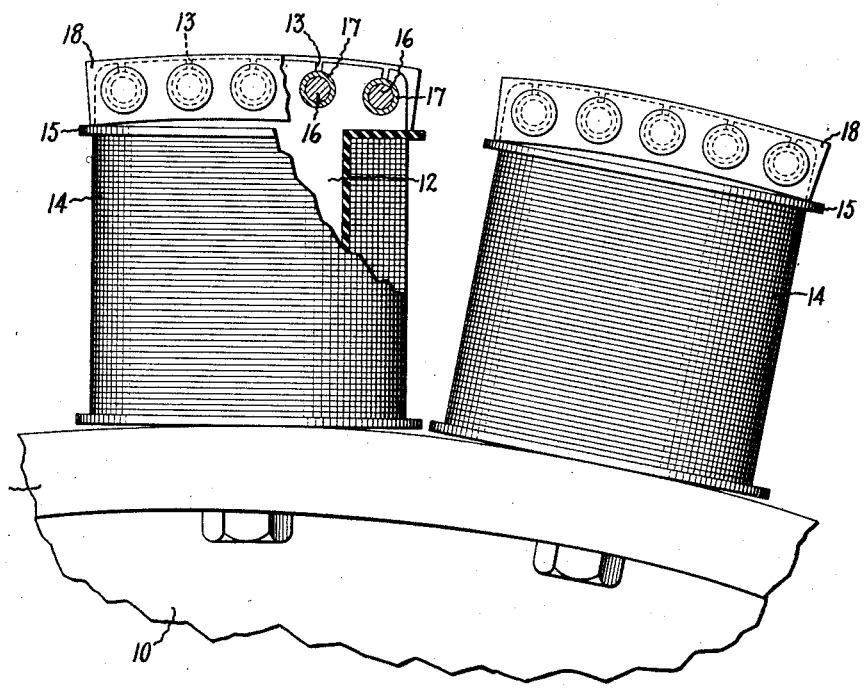
Figure 2:
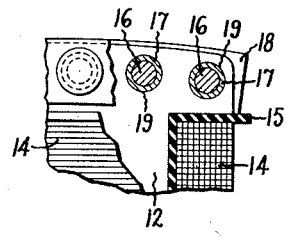

In the drawing Fig. 1 is a fragmentary view of a dynamoelectric machine showing pole pieces, one of which is partly broken away, incorporating an embodiment of my invention; and Fig. 2 is a fragmentary sectional view of a modification of the pole face winding shown in Fig. 1.

Referring to the drawing, I have shown a dynamoelectric machine of the synchronous alternating current type provided with a rotatable member having a supporting web 10 adapted to be mounted on a suitable shaft and provided with a circumferentially extending flange 11 of magnetic material on which a plurality of pole pieces is adapted to be secured. These pole pieces are formed with laminated cores 12 of magnetic material having winding slots 13 formed therein adjacent the outer ends of the pole pieces, and a field exciting winding 14 mounted about each pole piece and insulated therefrom by a suitable insulating element 15. An amortisseur winding which is adapted to function as a starting and damping winding for the machine is arranged in the winding slots 13 and includes a plurality of composite conductors which are formed with an inner core portion 16 of a relatively high resistance non-magnetic material, such as a non-magnetic iron alloy, and with an outer layer 17 of relatively low resistance electrically conductive material arranged about and intimately bonded to the outer surface of the iron alloy core 16. The outer portion 17 of the composite conductors may be made of any suitable material, such as copper or brass, and its dimensions relative to the core 16 may be varied to provide the desired resultant electrical resistance to the composite conductors. It has heretofore been proposed to form such composite conductors with magnetic cores. This, however, has disadvantages which my improved construction overcomes in that conductors with magnetic centers have a considerably lower torque characteristic near synchronizing speed than conductors made entirely of non-magnetic material and having the same electrical resistance. My improved arrangement provides the same desirable high torque as can be obtained by solid conductors made entirely of such material as brass and, in addition, has the advantage over brass bars in that these conductors are stronger, less expensive, and are made of material which is relatively more abundant. The ends of these conductors are electrically connected together by a short-circuiting end conductor 18 to form a closed squirrel cage winding and are secured to this end conductor by extending through openings therein and being formed as rivets or by being welded to this conductor.

Fig. 2 illustrates a modification of the pole face slot construction for the amortisseur winding in which the conductors are arranged in closed winding slots 19 in the laminations of the pole piece core.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A damping winding for a dynamoelectric machine including conductors formed of a relatively high resistance non-magnetic iron alloy with a relatively low resistance electrically conductive material intimately bonded to the outer surface of said iron alloy to provide the desired resultant electrical resistance to said conductors, and means for electrically connecting together said conductors to complete said winding.

2. A dynamoelectric machine having a core of magnetic material with winding slots therein, a damping winding including conductors in said slots formed of a non-magnetic iron alloy with a layer of copper arranged about the outer surface of said iron alloy to provide the desired resultant electrical resistance to said conductors, and means for electrically connecting together said conductors to complete said winding.

3. A dynamoelectric machine having a core of magnetic material with winding slots therein, a damping winding including conductors in said slots formed of a non-magnetic iron alloy with a layer of relatively low resistance electrically conductive material intimately bonded to the outer surface of said iron alloy to provide the desired resultant electrical resistance to said conductors, and means for electrically connecting together said conductors exteriorly of said core.

4. A dynamoelectric machine having pole pieces of magnetic material with winding slots therein adjacent the outer ends of said pole pieces, a damping winding including conductors in said slots formed of a relatively high resistance non-magnetic alloy with a layer of copper intimately bonded to the outer surface of said iron alloy to provide the desired resultant electrical resistance to said conductors, and means for electrically connecting together said conductors to complete said winding.

5. A dynamoelectric machine having a core of magnetic material with winding slots therein, a winding including conductors in said slots formed of a relatively high resistance non-magnetic iron alloy with a relatively low resistance electrically conductive material arranged about the outer surface of said iron alloy to provide the desired resultant electrical resistance to said conductors, and means for electrically connecting together said conductors to complete said winding.

6. A dynamoelectric machine having a laminated core of magnetic material forming pole pieces with winding slots therein adjacent the outer ends of said pole pieces, a damping winding including conductors in said slots formed of a relatively high resistance non-magnetic iron alloy with a relatively low resistance electrically conductive material intimately bonded to the outer surface of said iron alloy to provide the desired resultant electrical resistance to said conductors, and means for electrically connecting together said conductors exteriorly of said core.

CHARLES E. KILBOURNE.

REFERENCES CITED

The following references are of record in the file of this patent:

UNITED STATES PATENTS

| Number | Name | Date |
| --- | --- | --- |
| 2,003,587 | Fahlman | June 4, 1935 |
| 1,375,461 | Kimble | Apr. 19, 1921 |
| 1,597,189 | Gere | Aug. 24, 1926 |
| 1,751,559 | Schou | Mar. 25, 1930 |